June 25, 1935.  O. H. BANKER  2,005,726
PLANETARY TRANSMISSION MECHANISM
Filed June 29, 1933  3 Sheets-Sheet 1

INVENTOR
Oscar H. Banker
BY Charles & French
ATTORNEYS

June 25, 1935.　　　　O. H. BANKER　　　　2,005,726
PLANETARY TRANSMISSION MECHANISM
Filed June 29, 1933　　　3 Sheets-Sheet 2

June 25, 1935.　　　　O. H. BANKER　　　　2,005,726
PLANETARY TRANSMISSION MECHANISM
Filed June 29, 1933　　　3 Sheets-Sheet 3

INVENTOR
Oscar H. Banker
BY
Quarles & French
ATTORNEYS

Patented June 25, 1935

2,005,726

UNITED STATES PATENT OFFICE 2,005,726

PLANETARY TRANSMISSION MECHANISM

Oscar H. Banker, Chicago, Ill., assignor to New Products Corporation, Chicago, Ill., a corporation of Illinois Application June 29, 1933, Serial No. 678,122

1 Claim. (Cl. 74—271)

The invention relates to transmission mechanisms.

The object of the invention is to provide a transmission mechanism of the planetary gear type adapted to provide three forward speeds and a reverse of simple construction and particularly adapted for heavy duty service.

The invention further consists in the several features hereinafter set forth and more particularly defined by the claim at the conclusion hereof.

Figure 1:
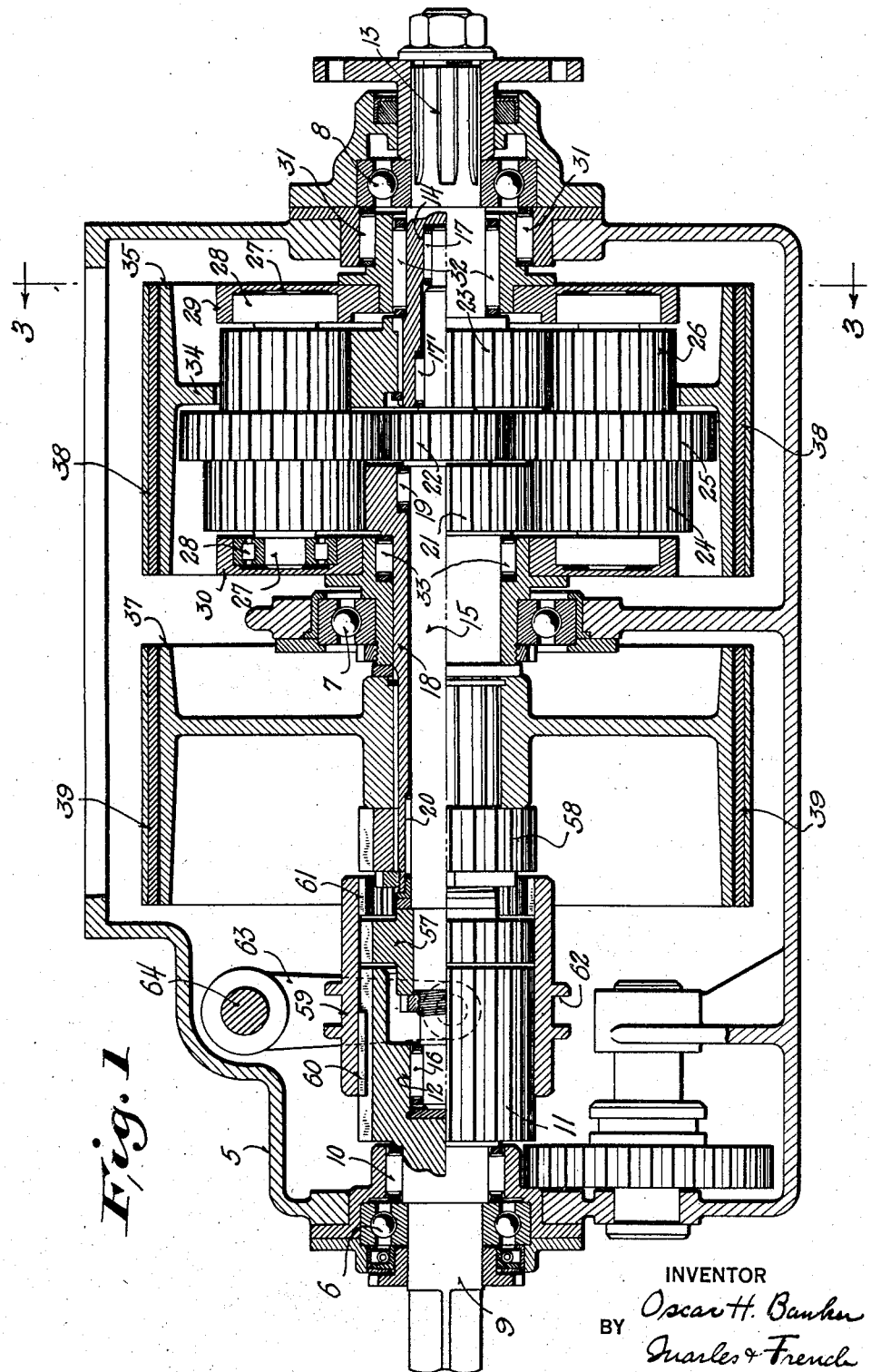
Fig. 1 is a vertical sectional view of a transmission mechanism embodying the invention, parts of the interior mechanism being shown half in full and half in section.
Figure 2:
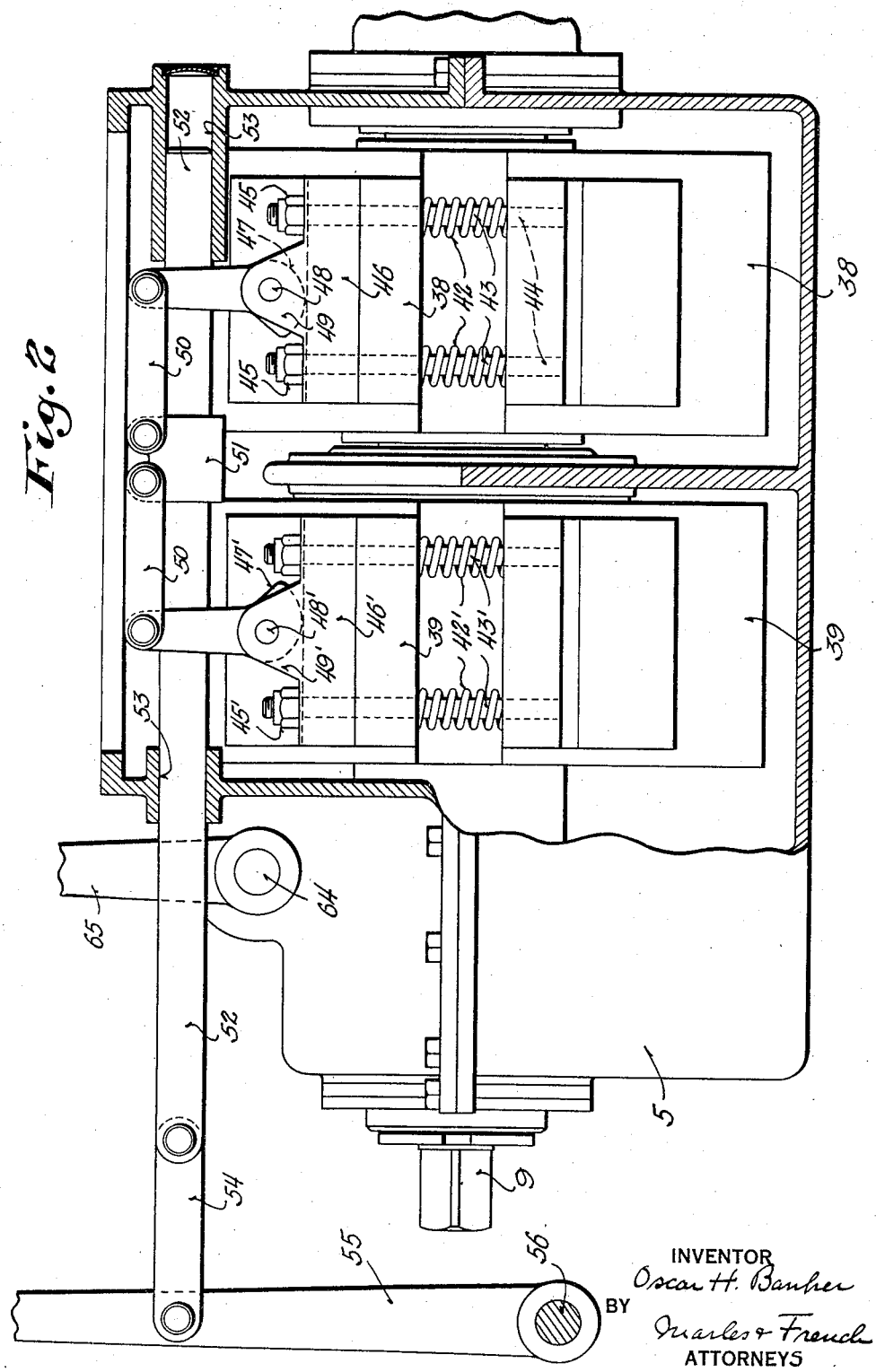
Fig. 2 is a side elevation view of the transmission mechanism, parts of the casing being broken away and parts being shown in section.

In the drawings, the numeral 5 designates the casing, 6, 7 and 8 bearings mounted in said casing for supporting the shafts and the change speed gearing. The drive shaft 9 is mounted in the bearing 6 and also in an auxiliary roller bearing 10 and its inner end is formed to provide a long toothed clutch element 11 and a bearing recess 12.

The driven shaft 13 is mounted in the bearing 8 and is provided with a bearing recess 14.

A transmission shaft 15 has one end journalled in roller bearings 16 in the recess 12 and the other end journalled in sets of roller bearings 17 and 17' in the recess 14.

A sleeve shaft 18 is mounted to turn freely on roller bearings 19 and 20 and has a gear 21 secured to it or formed integral with it.

A gear 22 is formed integral with or secured to the shaft 15.

A gear 23 is keyed to the driven shaft 13.

The gears 21, 22 and 23 form sun gears of a planetary gearing and mesh respectively with sets of planet gears 24, 25 and 26. Each set of gears 24, 25, and 26 is preferably formed as a compound gear having shaft portions 27 journalled in roller bearings 28 in the parts 29 and 30 of the planetary gear carrier. The hub of the part 29 of said carrier is journalled in a roller bearing 31 mounted in the casing 5 and journalled on the roller bearings 32 surrounding the shaft 9. The hub of the part 30 of said carrier is journalled in the ball bearing 7 and on roller bearings 33 surrounding the sleeve shaft 18.

The parts 29 and 30 of the planetary carrier are suitably secured together and to the web 34 of a brake drum 35 by the bolts 36.

A brake drum 37 is keyed to the sleeve shaft 18.

Brake members 38 are adapted to be engaged with the drum 35 to hold it and the carrier stationary while similar brake members 39 are adapted to be engaged with the drum 37 to hold the shaft 18 stationary.

Figure 3:
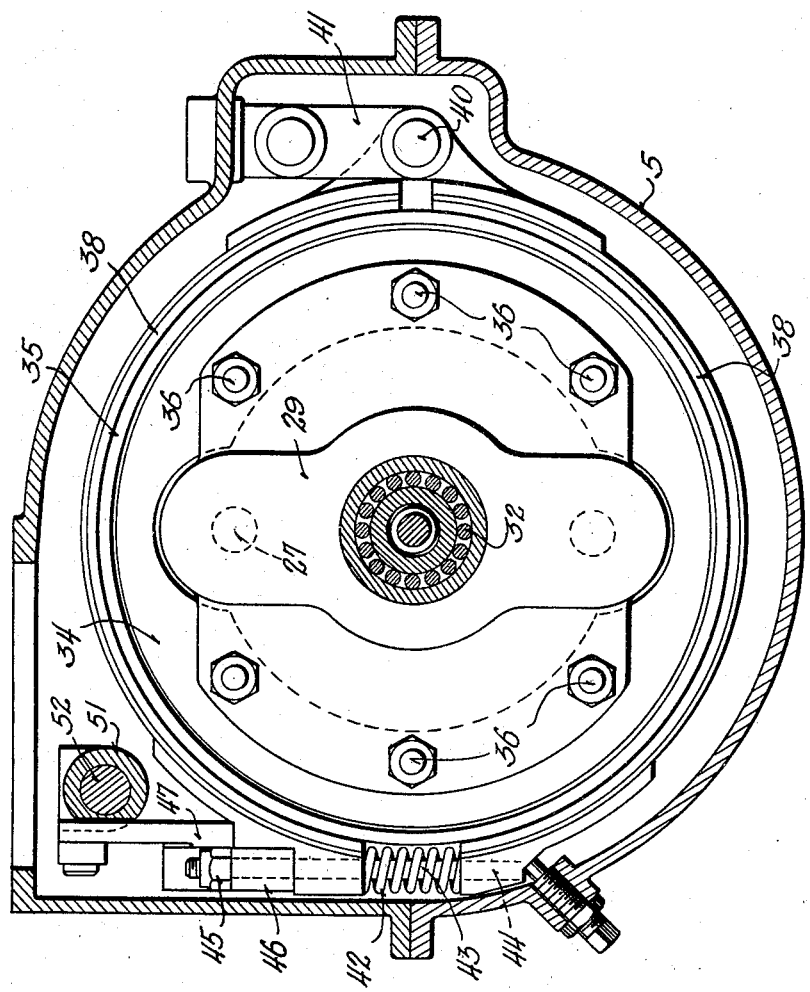
Fig. 3 is a detail sectional view taken on the line 3—3 of Fig. 1.

As shown in detail in Fig. 3 the brake members 38 are in the form of semi-circular bands or shoes pivotally mounted at one end on a pin 40 secured to a supporting link 41 and normally held in a release position by springs 42 which are maintained under a predetermined amount of tension by rods 43 anchored at one of their ends 44 in one of the shoes and extending through said springs and guide openings in the other of said shoes and provided with threaded ends carrying tension adjusting nuts 45 which in the construction shown engage a block 46 interposed between said nuts and the upper shoe. This block 46 forms the pivotal support for a brake operating eccentric or cam member 47 secured to a pivot pin 48 supported in a lug 49 in said block.

The brake members 39 while not shown in detail are pivotally supported at one end in a manner similar to the members 38 and are held in a release position by springs 42' and rods 43' which are similar to the springs 42 and rods 43 previously described, the rods carrying nuts 45' which engage a block 46', similar to the block 46, and forming a pivotal support for the brake operating cam member 47' secured to a pivot pin 48' supported in a lug 49' in said block.

The cam members 47 and 47' are designed to operate in opposite directions so that when one brake is applied the other is in released position.

For operating the cam members 47 and 47', which are in the form of levers, said members have their long arms operatively connected by links 50 with a collar 51 secured to a shift rod 52 slidably mounted in bores 53 in the casing and connected by a link 54 with the intermediate portion of an operating lever 55 pivotally supported at 56.

A jaw clutch member 57 having clutch teeth alined with those of element 11 is secured to the shaft 15 and a similar clutch member 58 is keyed to the sleeve shaft 18.

A shiftable jaw clutch element 59 has teeth 60 adapted to slidably engage those of the element 11 and teeth 61 adapted to engage either the member 57 or 58 or be moved to a neutral position between said members.

For shifting the element 59, the same is provided with an annular groove 62 in which the forked ends of a shifter fork 63 are operatively mounted, said fork secured to a shaft 64 pivotally mounted in the casing 5 and carrying an operating lever 65.

With the above described construction, when the clutch element 59 is moved to bring the teeth 61 into engagement with those of the clutch member 57 and the brake members 38 are applied to the drum 35 then the shaft 15 is driven through said clutch connection from the shaft 9 and the gear 22 drives the planet gears 25 and 26 which gears 26 turn the gear 23 and hence the driven shaft 13 at low speed. For second speed, the clutch element 59 is moved to bring the teeth 61 into engagement with the teeth of the clutch member 58 and the brake members 38 are applied to the drum 35 then the sleeve shaft 18 is driven through said clutch connection from the shaft 9 and the gear 21 drives the planet gears 24 and 26 which gears 26 turn the gear 23 and hence the driven shaft 13 at second speed. With both brake elements free and the clutch element 59 shifted so that the teeth 60 mesh with both clutch elements 11 and 57 and its teeth 61 mesh with the clutch element 58 then the shafts 9, 15 and 18 are locked together and consequently the gears of the planetary gearing are locked together and revolve as a unit with the driven shaft which is then driven direct. Shifting the clutch element 59 to bring the teeth 61 into engagement with those of the clutch member 57 and applying the brake members 39 to the drum 37 provides the reverse since the shaft 18 and the gear 21 are then stationary while the planet gears 24 driven by the gears 22 and 25 rotate around the fixed gear 21 and through the gears 26 meshing with the gear 23 drive the shaft 13 in a counterclockwise or reverse direction.

It is to be noted that the movements of the clutch element 59 to its different positions is accomplished through the movement of the lever 65 and the application and release of the brake members is under the control of the lever 55.

I desire it to be understood that this invention is not to be limited to any particular form or arrangements of parts except in so far as such limitations are included in the claim.

What I claim as my invention is:

In a change speed gear mechanism, the combination of a drive shaft, a pair of transmission drive shafts, a driven shaft, change speed planetary gearing between said transmission shafts and said driven shaft including sun gears on each of said shafts, a planetary gear carrier and planet gears on said carrier meshing with said sun gears, a brake drum connected to said carrier, a brake band engageable with said drum for holding said carrier against movement in low and second speed drive, a lever provided with a cam for applying said band, a brake drum on one of said transmission drive shafts, a brake band engageable with said last named drum for holding said shaft against movement in reverse, a lever provided with a cam for applying said last named band, a single lever operatively connected to and controlling both of said bands independently and clutch mechanism for selectively connecting said drive shafts with said transmission.

OSCAR H. BANKER.